United States Patent
Yamada

(10) Patent No.: US 9,041,943 B2
(45) Date of Patent: May 26, 2015

(54) IMAGE PROCESSING SYSTEM AND IMAGE PROCESSING APPARATUS HAVING FUNCTION AUTHORIZATION NOTIFICATION

(75) Inventor: Akihiro Yamada, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 874 days.

(21) Appl. No.: 12/723,106

(22) Filed: Mar. 12, 2010

(65) Prior Publication Data

US 2010/0238478 A1 Sep. 23, 2010

(30) Foreign Application Priority Data

Mar. 19, 2009 (JP) ................................. 2009-067819

(51) Int. Cl.
*G06F 3/12* (2006.01)
*H04N 1/44* (2006.01)
*H04N 1/00* (2006.01)

(52) U.S. Cl.
CPC ............ *H04N 1/4406* (2013.01); *G06F 3/1238* (2013.01); *H04N 1/0035* (2013.01); *H04N 1/0048* (2013.01); *H04N 1/4433* (2013.01); *H04N 1/444* (2013.01)

(58) Field of Classification Search
None
See application file for complete search history.

(56) References Cited

U.S. PATENT DOCUMENTS

| | | | |
|---|---|---|---|
| 5,767,853 A | 6/1998 | Yoshida et al. | |
| 2005/0185217 A1 | 8/2005 | Nishizawa et al. | |
| 2006/0129539 A1 | 6/2006 | Nakatomi | |
| 2007/0115493 A1* | 5/2007 | Haginaka et al. | 358/1.14 |
| 2007/0226808 A1* | 9/2007 | Uchikawa | 726/27 |
| 2007/0229886 A1* | 10/2007 | Sakurai | 358/1.15 |
| 2007/0273913 A1* | 11/2007 | Nakata | 358/1.14 |
| 2007/0283414 A1* | 12/2007 | Sugiyama | 726/1 |
| 2008/0008318 A1 | 1/2008 | Kinoshita | |
| 2008/0127307 A1 | 5/2008 | Fukuta | |
| 2008/0134179 A1* | 6/2008 | Takahashi | 718/100 |
| 2008/0137134 A1* | 6/2008 | Igarashi | 358/1.15 |
| 2008/0212123 A1* | 9/2008 | Mizutani et al. | 358/1.13 |
| 2009/0103135 A1* | 4/2009 | Tran et al. | 358/1.16 |
| 2009/0103136 A1* | 4/2009 | Tran et al. | 358/1.16 |

(Continued)

FOREIGN PATENT DOCUMENTS

| | | |
|---|---|---|
| JP | 6-149962 | 5/1994 |
| JP | 8-101766 | 4/1996 |

(Continued)

OTHER PUBLICATIONS

Japanese Official Action dated Mar. 29, 2011 together with a partial English language translation from JP 2009-067819.

(Continued)

*Primary Examiner* — Nicholas Pachol
(74) *Attorney, Agent, or Firm* — Scully, Scott, Murphy & Presser, PC

(57) ABSTRACT

An image processing system that executes plural functions with respect to image data, the image processing system including: a decision unit that decides whether or not a function among the plural functions is authorized to be executed with respect to the image data; and a notification unit that identifiably notifies an authorized function, which is authorized to be executed with respect to the image data, and an unauthorized function, which is not authorized to be executed with respect to the image data, decided by the decision unit.

8 Claims, 9 Drawing Sheets

(56) References Cited

U.S. PATENT DOCUMENTS

| | | | |
|---|---|---|---|
| 2009/0109476 A1* | 4/2009 | Ando | 358/1.15 |
| 2009/0122347 A1* | 5/2009 | Utsubo et al. | 358/1.16 |
| 2009/0147306 A1* | 6/2009 | Sugiyama | 358/1.15 |

FOREIGN PATENT DOCUMENTS

| | | |
|---|---|---|
| JP | 2001-218030 | 8/2001 |
| JP | 2002-244788 | 8/2002 |
| JP | 2004-110243 | 4/2004 |
| JP | 2004-184729 A | 7/2004 |
| JP | 2005-244488 | 9/2005 |
| JP | 2006-244205 | 9/2006 |
| JP | 2006-321073 A | 11/2006 |
| JP | 2006-345211 A | 12/2006 |
| JP | 2007-018316 | 1/2007 |
| JP | 2007-079308 A | 3/2007 |
| JP | 2007-087044 | 4/2007 |
| JP | 2007-141013 | 6/2007 |
| JP | 2007-141190 | 6/2007 |
| JP | 2008-022547 A | 1/2008 |
| JP | 2008-193733 | 8/2008 |
| JP | 2009-182671 A | 8/2009 |
| JP | 2010-217949 | 9/2010 |
| WO | WO 2007/129763 A1 | 11/2007 |

OTHER PUBLICATIONS

Japanese Office Action mailed Feb. 15, 2011 in corresponding Japanese Patent Application No. 2009-067819, together with English language translation.

Chinese Office Action dated May 28, 2012 from related Application No. 201010143329.5, together with an English language translation.

Chinese Official Action dated Oct. 26, 2011 from related Application No. 201010143329.5, together with an English language translation.

Notification of Reasons for Refusal mailed Nov. 30, 2010 in corresponding Japanese Patent Application No. 2009-067819, together with English language translation.

Extended European Search Report dated May 4, 2011 from EP 10250381.0.

* cited by examiner

|  | TIF | PDF | DOC | NUMBER OF PRINTABLE SHEETS | NUMBER OF PRESENT PRINTED SHEETS |
|---|---|---|---|---|---|
| COMMON | Email FAX | ALL | ALL | 1000 | 750 |
| USER A | Email | Email FAX | DIRECT FAX | 100 | 30 |
| USER B | (NONE) | DIRECT FAX | DIRECT Email | 50 | 45 |

AUTHORIZATION SETTING (USER A)
FILE TYPE: TIF
☒ Email
☐ FAX
☐ DIRECT PRINTING
SELECT FUNCTION OF AUTHORIZATION
▲
▼

IMAGE PROCESSING SYSTEM AND IMAGE PROCESSING APPARATUS HAVING FUNCTION AUTHORIZATION NOTIFICATION

CROSS-REFERENCE TO RELATED APPLICATIONS

This application claims priority from Japanese Patent Application No. 2009-067819 filed on Mar. 19, 2009, the entire subject matter of which is incorporated herein by reference.

TECHNICAL FIELD

The present invention relates to an image processing system and an image processing apparatus having plural functions of printing, scanning, copying, FAX transmitting and receiving, etc. More particularly, the invention relates to an image processing system and an image processing apparatus capable of limiting use of each functions.

BACKGROUND

There has been proposed an image processing apparatus having plural functions of printing, scanning,z copying, FAX transmitting and receiving, etc. In such an image processing apparatus, there has been proposed an art of limiting an available function according to user information or a file attribute for each image data. For example, a known multi-function peripheral reads user information by an electromagnetic signal and limits an available function of a user according to function use limit information.

SUMMARY

The known multi-function peripheral, however, is unable to grasp that execution of any function is authorized with respect to individual image data when a user attempts to instruct execution of a function. Thus, usability becomes worse.

Illustrative aspects of the invention provide an image processing system and an image processing apparatus in which a user can simply grasp whether or not execution of a function is authorized.

According to one illustrative aspect of the invention, there is provided an image processing system that executes plural functions with respect to image data, the image processing system comprising: a decision unit that decides whether or not a function among the plural functions is authorized to be executed with respect to the image data; and a notification unit that identifiably notifies an authorized function, which is authorized to be executed with respect to the image data, and an unauthorized function, which is not authorized to be executed with respect to the image data, decided by the decision unit.

According to another illustrative aspect of the invention, there is provided an image processing apparatus that executes plural functions with respect to image data, the image processing apparatus comprising: a decision unit that decides whether or not a function among the plural functions is authorized to be executed with respect to image data; and a notification unit that identifiably notifies an authorized function, which is authorized to be executed with respect to the image data, and an unauthorized function, which is not authorized to be executed with respect to the image data, decided by the decision unit.

According to the illustrative aspects of the invention, it is possible to provide an image processing system and an image processing apparatus in which a user can simply grasp whether or not execution of a function is authorized.

BRIEF DESCRIPTION OF THE DRAWINGS

FIG. 3 is a diagram showing an example of an authorization table;
FIG. 4 is a diagram showing one example of a setting screen for making authorization setting for each file type.

DETAILED DESCRIPTION

Exemplary embodiments of the invention will now be described with reference to the drawings. In the exemplary embodiment, the invention is applied to a multi-function peripheral (MFP) having plural functions with respect to image data.

(MFP)

Figure 1:
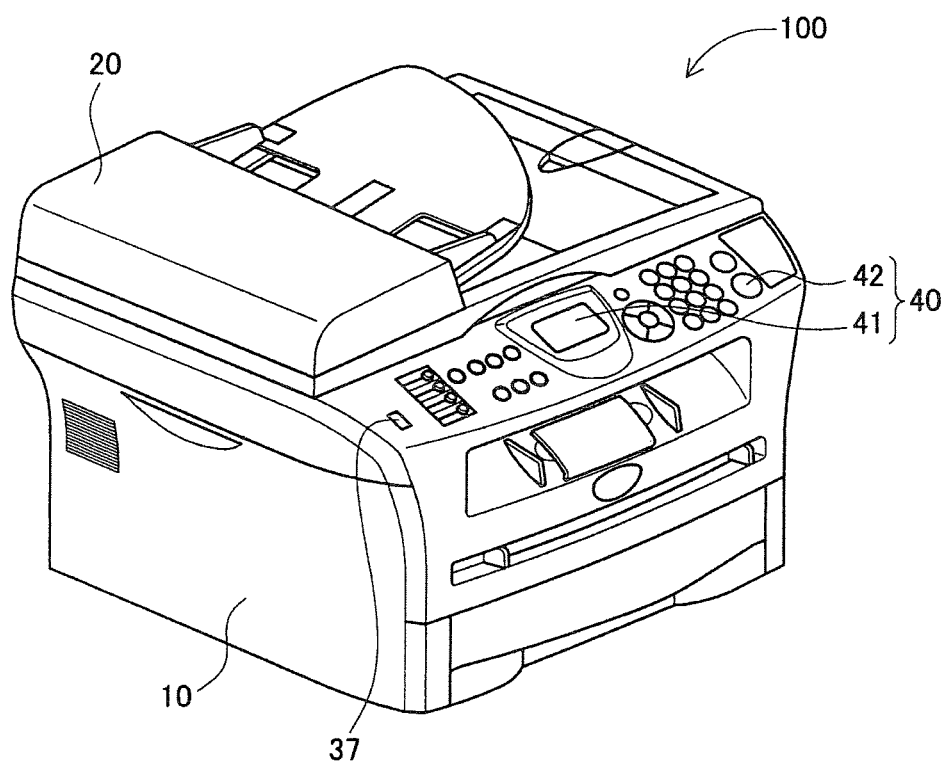
FIG. 1 is a schematic perspective view of an MFP according to an exemplary embodiment of the invention.

As shown in FIG. 1, an MFP 100 according to the exemplary embodiment includes an image forming unit 10 (one example of a notification unit) for printing an image on a sheet and an image reading unit 20 for reading an image of a manuscript. An operation panel 40 is provided on the front side of the image reading unit 20. The operation panel 40 includes a display unit 41 (one example of a notification unit) made of a liquid crystal display and a button group 42 including an OK key, a cancel key, a ten-key pad, etc. The operation panel 40 displays an operation state and allows a user to perform input operation.

A USB interface 37 is provided on the front side of the image reading unit 20. A peripheral device, which complies with a Universal Serial Bus (USB) standard, can be attached to and detached from the MFP 100 through the USB interface 37. For example, when a USB memory, which is an information storage medium and is one example of an external storage medium, is attached to the USB interface 37, the MFP 100 can access a file stored in the USB memory.

The MFP 100 has an electronic mail sending function, a FAX transmitting function and a printing function as a function executable with respect to the image file. Incidentally, a function of printing an image of an image file of the inside of the USB memory is called a "direct printing function". Execution of each of the functions is instructed by operating the operation panel 40.

For example, the button group 42 of the operation panel 40 includes a FAX key, a direct key and an E mail key. The FAX key is a button for executing FAX transmission of an image of the image file. The direct key is a button for executing printing an image of the image file. The E mail key is a button for executing electronic mail sending of the image file. For example, if the FAX key is pressed, the display unit 41 is switched to a list screen of an image file capable of being transmitted by FAX. Then, by selecting an image file on the list screen and pressing the OK key, FAX transmission of the selected image file is executed. In addition, in the direct key and the E mail key, printing and electronic mail sending are executed by a similar procedure as that of the FAX transmission. Details of display of an execution screen will be described later.

(Electrical Configuration of MFP)

Figure 2:
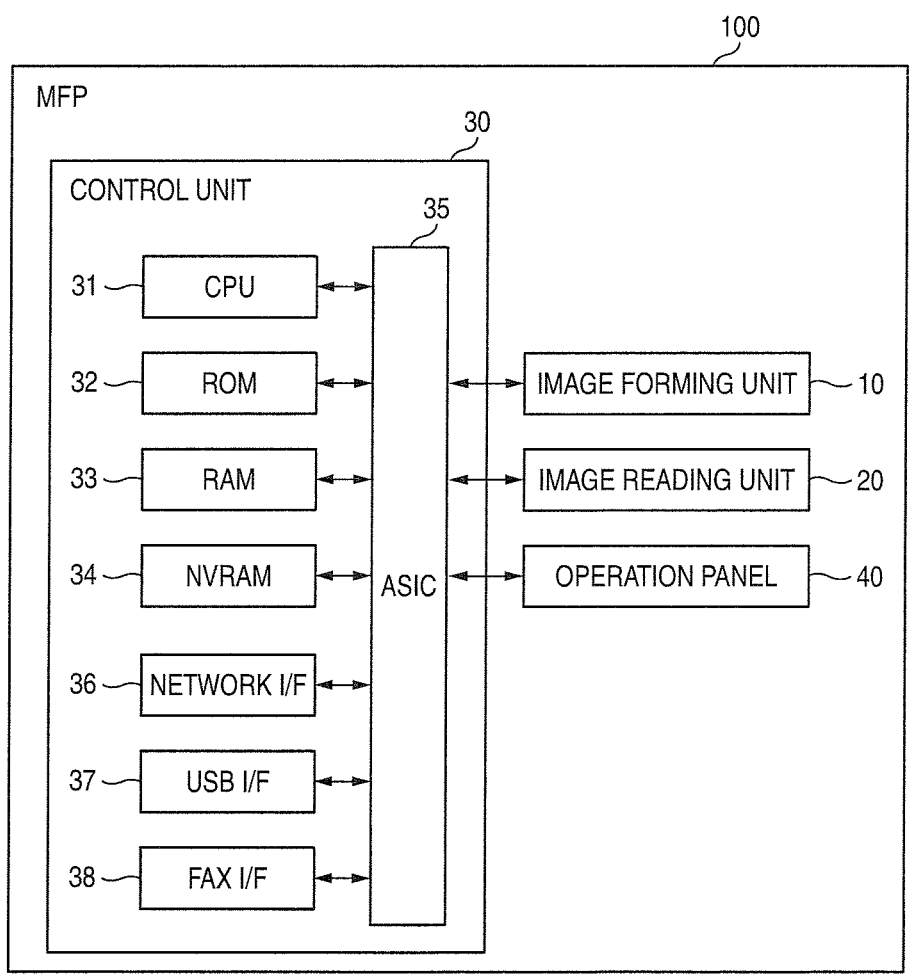
FIG. 2 is a block diagram showing an electrical configuration of the MFP.

Referring to FIG. 2, an electrical configuration of the MFP 100 will be described. The MFP 100 includes a control unit 30 including a CPU 31, ROM 32, RAM 33, NVRAM 34, an ASIC 35, a network interface 36, the USB interface 37 and a FAX interface 38 as shown in FIG. 2.

The CPU 31 executes computation for implementing various functions such as an image forming function or an image reading function in the MFP 100. That is, the CPU 31 is a center of control. Incidentally, the CPU 31 functions as a decision unit, a setting unit, a function selecting unit and an image selecting unit. The ROM 32 stores various control programs for controlling the MFP 100, an initial value, various settings, etc. The RAM 33 is used as a work area where various control programs are read out or a storage area where the image data is temporarily stored. The Non Volatile RAM (NVRAM) 34 is a storage unit having nonvolatility. The NVRAM 34 is used as a storage area for saving various settings, image data, etc.

The CPU 31 controls components of the MFP 100 through the ASIC 35 while storing the processing result in the RAM 33 or the NVRAM 34 according to a signal sent from various sensors or the control programs read out of the ROM 32. For example, the CPU 31 controls timing of lighting of an exposure device constructing the image forming unit 10, driving motors (not shown) of various rollers of a conveyance path of the sheet, and motors (not shown) for movement of an image sensor unit of the image reading unit 20.

The network interface 36 is connected to a network such as the Internet and can make connection to an information processing device such as a PC. The USB interface 37 can make connection to a peripheral device such as the USB memory. The FAX interface 38 is connected to a telephone line and can make connection to a destination FAX device. The MFP 100 can send/receive data via the network interface 36, the USB interface 37 or the FAX interface 38.

(Limiting Function)

Subsequently, a limiting function of the MFP 100 will be described. The MFP 100 has a function of limiting execution of each function for each image file based on user information and an attribute of the image file. Incidentally, although the MFP 100 has plural functions, description will be made to three functions: a direct printing function; a FAX transmitting function; and an electronic mail sending function for simplifying the following description.

In order to implement the limiting function, the MFP 100 includes an authorization table 341 as shown in FIG. 3. The authorization table 341 stores a function of authorizing execution per combination of user information and file extensions. For example, in a setting shown in FIG. 3, "Email" is stored in combination of a user A and a file extension "TIF". In this combination, execution of the electronic mail sending function is authorized while execution of the other functions is limited. Incidentally, in the authorization table 341, "direct" means that the direct printing function is authorized, and "FAX" means that the FAX transmitting function is authorized, and "ALL" means that all the functions of direct printing function, FAX transmitting function and electronic mail sending function are authorized, and "(none)" means that there is no function authorized.

In the authorization table 341, the number of sheets of authorized printing is set for each user. Further, the number of sheets printed at the present point in time (the number of present printed sheets) is stored and is automatically updated each time the printing is executed. For example, in the authorization table 341 shown in FIG. 3, the number of printable sheets for the user A is stored as 100 (sheets), and the number of present printed sheets by the user A is stored as 30 (sheets). As a result, the user A can print the remaining 70 sheets, and execution of printing of more than 70 sheets is limited.

The MFP 100 has a function of changing the contents of setting of the authorization table 341. The MFP 100 displays on the display unit 41 an authorization setting screen (one example of a setting unit) for selecting a function of authorizing execution for each file type as shown in FIG. 4. The authorization setting screen includes a plurality of check box corresponding to each function of the MFP 100. By turning on or off the check box in the authorization setting screen, the contents of setting of the authorization table 341 can be changed. There is also prepared a screen capable of changing setting of the number of printable sheets. Consequently, authorization of the function can be set according to free setting by a user.

(Notification Processing)

Figure 5:
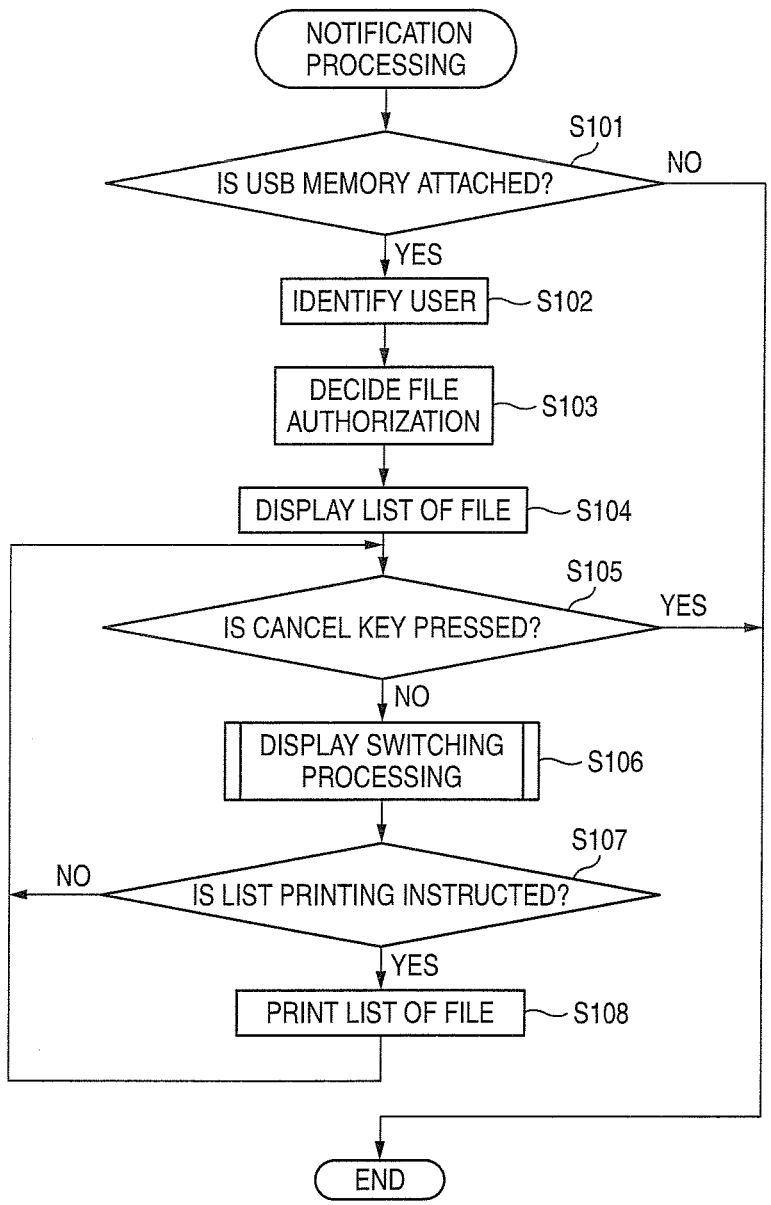
FIG. 5 is a flowchart showing a procedure of notification processing.

Notification processing (one example of a decision unit and a notification unit) in the MFP 100 will be described. In the notification processing, notification of an available function or notification of an executable image file is provided by printing on a sheet or display on the display unit 41. Referring to FIG. 5, a procedure of the notification processing will be described. Incidentally, the notification processing is executed periodically.

First, it is decided whether or not USB memory is attached to the USB interface 37 (S101). S101 detects that the USB memory changes from a detached state to an attached state, and a decision of YES is made only once at the time of attachment of the USB memory and a decision of NO is made while the attached state of the USB memory is maintained. If it is not decided that the USB memory is attached (S101: NO), the notification processing is ended.

If it is decided that the USB memory is attached (S101: YES), a user is identified (S102). For example, if a user is in a log-in state of the MFP 100, the user can be identified based on user information acquired when the user logged in the MFP 100. Alternatively, it may be configured to display on the display unit 41 a screen for prompting an input of user information in order to identify a user based on information inputted by the user. Further, if the user authentication can be performed by an ID card etc. without input operation from a user, the user may be identified based on authentication information when performing the user authentication.

Next, a function of authorizing execution is decided for each image file stored in the USB memory (S103). That is, it is decided which function is authorized for each image file with reference to the authorization table 341. Further, the number of pages is acquired from attribute information about the image file, and it is decided whether or not printing can be done by collating the number of pages with the number of present printed sheets. A result of decision is stored in the NVRAM 34.

Then, a list of the image files stored in the USB memory is displayed on the display unit 41 (S104). Incidentally, if a folder is formed inside the USB memory and the image file is hierarchically managed, the folder is also displayed together with the image file.

Figure 6:
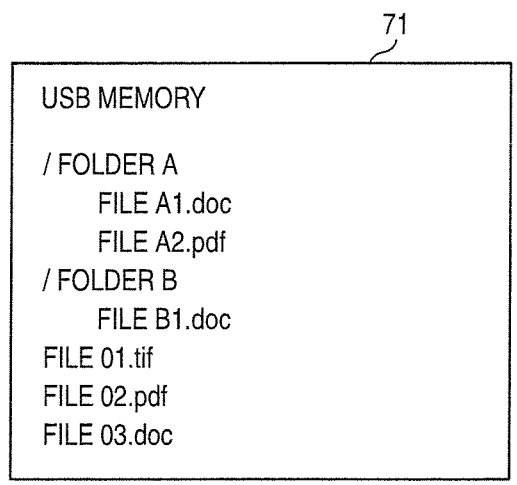
FIG. 6 is a diagram showing one example of a file storage configuration of USB memory.
Figure 7:
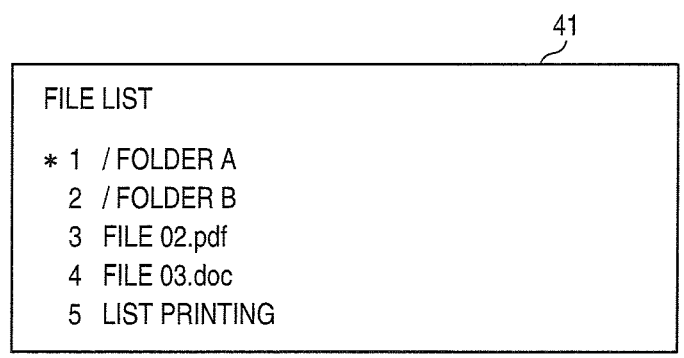
FIG. 7 is a diagram showing an example of list display of an image file.

In S104, the image file having no function of authorizing execution among the image files stored in the USB memory is not displayed. For example, assumed that plural image files is stored inside the USB memory 71 by a folder configuration as shown in FIG. 6, and a user B attaches the USB memory 71 to the MFP 100. Referring to the authorization table 341 shown in FIG. 3, in the user B, FAX transmission and direct printing of a file with an extension of "PDF" are authorized and electronic mail sending and direct printing of a file with an extension of "DOC" are authorized. On the other hand, no function of a file with an extension of "TIF" is authorized. As a result, as shown in FIG. 7, "file01.tif" with the extension of "TIF" among the image files stored in the USB memory 71 is not displayed in S104. Incidentally, the following display of the display unit 41 will be described by taking display about the user B as an example.

After the list of the image files is displayed, it is decided whether or not a cancel key is pressed (S105). If the cancel key is not pressed (S105: NO), display switching processing of the display unit 41 is performed (S106). In the display switching processing of S106, pressing of each button of the button group 42 is detected, and display of the display unit 41 is switched in response to the pressing of each button.

Figure 8:
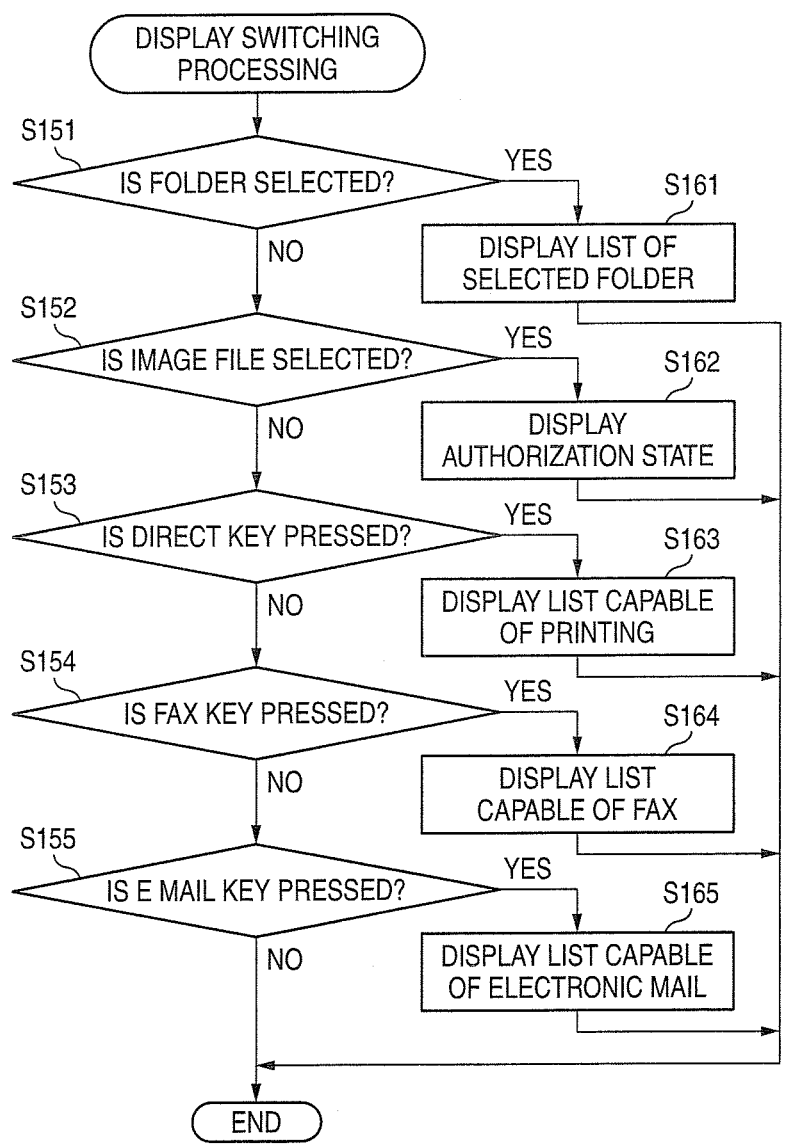
FIG. 8 is a flowchart showing a procedure of display switching processing.
Figure 9A:
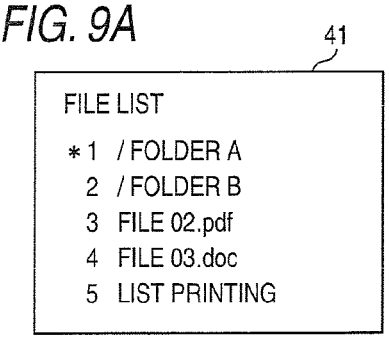
FIG. 9 is a diagram showing one example of screen transition of the display switching processing.
Figure 9C:
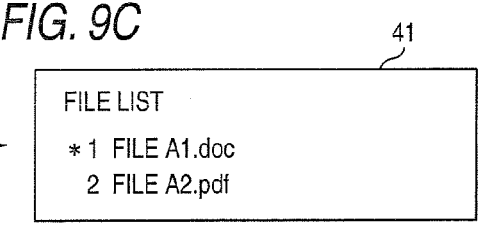
Figure 9B:
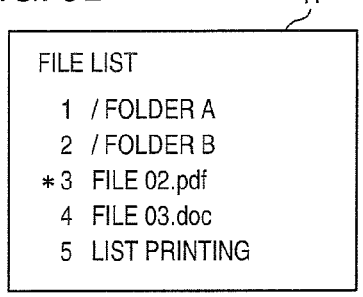

Here, the display switching processing (one example of a function selection unit and an image selection unit) will be described with reference to a flowchart of FIG. 8 and an image transition diagram of FIGS. 9A to 9H showing display states of a screen of the display unit 41. Mark "*" in the screen means any of a function, a folder and a file selected at present. By pressing an up-arrow key or a down-arrow key in the button group 42, the "*" mark moves upward and downward in the screen as shown in FIGS. 9A and 9B to switch a selection target.

In the display switching processing, it is first decided whether or not a folder is selected (S151). The selection of the folder is made by a decision as to whether or not the OK key is pressed in a state of selecting the folder as shown in FIG. 9A. If the folder is selected (S151: YES), a list of a folder and image files of the included in the selected folder are displayed as shown in FIG. 9C (S161).

Figure 9D:
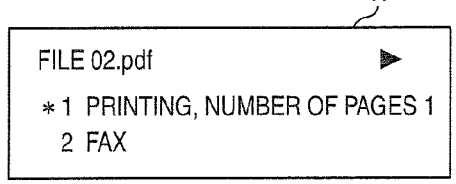
Figure 9E:
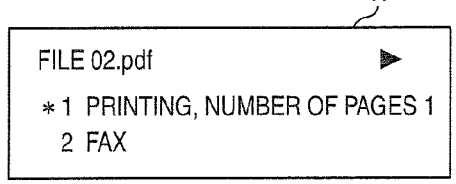

In contrast, if the folder is not selected (S151: NO), it is decided whether or not an image file is selected (S152). The selection of the image file is made by deciding whether or not the OK key is pressed in a state of selecting the image file as shown in FIGS. 9B and 9C. If the image file is selected (S152: YES), a list of functions authorized in the selected image file is displayed as shown in FIGS. 9D and 9E (S162). By displaying the list of functions, the authorized function can collectively be grasped for each image file. If pressing of an OK key is detected in this state, a function selected by the "*" mark is executed.

Figure 10:
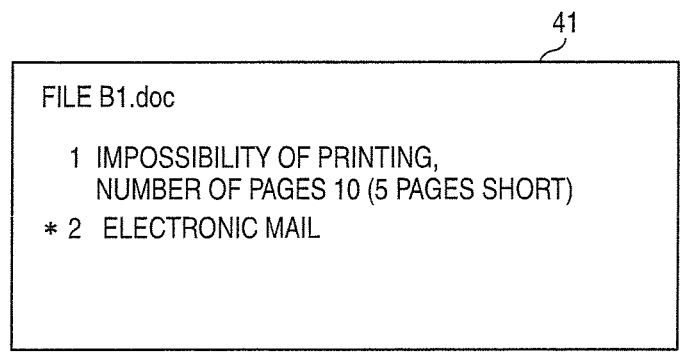
FIG. 10 is a diagram showing an example of list display of a function.

Incidentally, if a direct printing function is authorized to the selected image file, the number of pages is also displayed in S162. Further, if the number of pages exceeds the remaining number of printable sheets obtained from the number of present printed sheets and the number of printable sheets set for each user, execution of the direct printing is limited due to a limit for the number of sheets of execution while execution of the direct printing is authorized as the function. Therefore, as shown in FIG. 10, the display unit 41 displays that the printing is disabled. That is, the image file is not displayed if execution of the direct printing function of the image file is not authorized; "printing is disabled" is displayed if the direct printing function of the image file is not executed due to the limit for the number of sheets of execution. In other words, the display is switched depend on a reason that execution of a function is disabled. According thereto, it becomes possible to presume the reason that execution of the function is disabled.

Figure 9G:
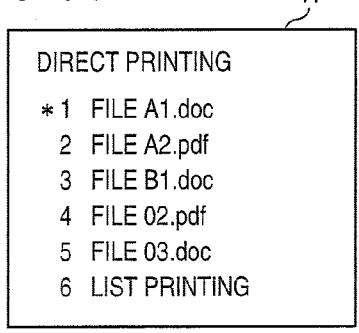
Figure 9F:
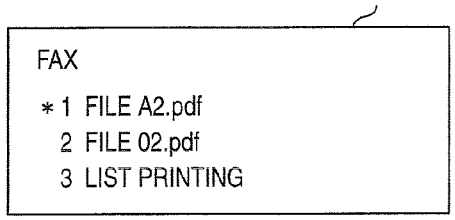

If pressing of a right arrow key or a left arrow key in the button group 42 is detected while displaying the function of the image file, the display unit 41 is switched to display information about other image files stored in the same hierarchy as shown in FIGS. 9E and 9F.

In contrast, if the image file is not selected (S152: NO), it is decided whether or not the direct key is pressed (S153). If the direct key is pressed (S153: YES), image files, in which execution of the direct printing function is authorized and the number of pages is within the remaining number of printable sheets, are extracted and a list of the image files is displayed as shown in FIG. 9G (S163). If pressing of the OK key is detected in this state, various settings such as setting of the number of sheets of direct printing are made, and direct printing of an image of the image file selected by the "*" mark is executed.

Figure 9H:
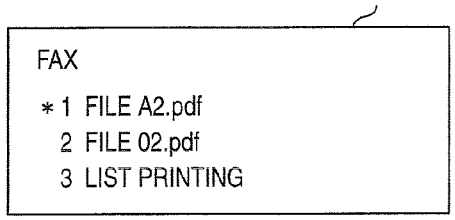

In contrast, if the direct key is not pressed (S153: NO), it is decided whether or not the FAX key is pressed (S154). If the FAX key is pressed (S154: YES), image files, in which execution of the FAX transmitting function is authorized, are extracted, and a list of the image files is displayed as shown in FIG. 9H (S164). If pressing of the OK key is detected in this state, various settings such as setting of a destination of the FAX are made, and FAX transmission of an image of the image file selected by the "*" mark is executed.

In contrast, if the FAX key is not pressed (S154: NO), it is decided whether or not the E mail key is pressed (S155). If the E mail key is pressed (S155: YES), image files, in which execution of the electronic mail sending function is authorized, are extracted, and a list of the image files is displayed in a manner that is similar to the direct key or the FAX key (S165). If pressing of the OK key is detected in this state, various settings such as setting of a destination address of electronic mail sending are made, and electronic mail sending of the selected image file is executed.

In contrast, if the E mail key is not pressed (S155: NO) or after the contents of display are switched in any of S161, S162, S163, S164 and S165, the display switching processing is ended. Incidentally, if pressing of a back key is detected after the contents of display are switched in any of S161, S162, S163, S164 and S165, the screen returns to the contents of display before the contents of the display are switched.

Returning to the description of the notification processing of FIG. 5, it is decided whether or not list printing is instructed after the display switching processing of S106 (S107). The instructions on the list printing are given by a decision as to whether or not an OK key is pressed in a state of selecting "list printing" displayed on a list screen (for example, FIGS. 9A, 9F, 9G and 9H) of the image files. If the list printing is instructed (S107: YES), the list printing of the image files is executed (S108).

Figure 11:
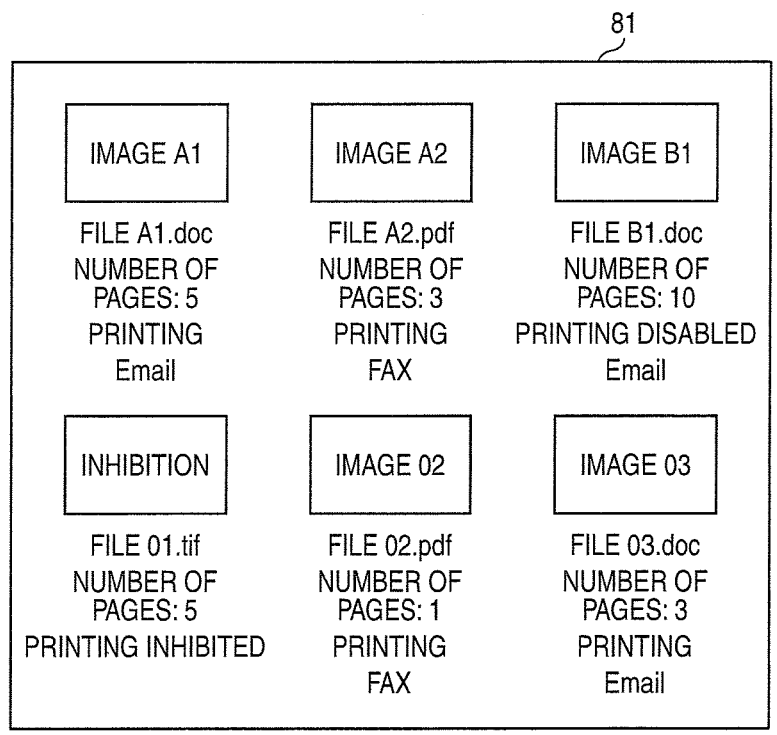
FIG. 11 is a diagram showing an output example of file list printing processing.

The list printing of S108 has a printing form (the so-called index printing) of printing information about the image files stored in the USB memory on a sheet 81 in a list format as shown in FIG. 11. In the exemplary embodiment, an image file name, the number of pages, an authorized function and a thumbnail image are printed as the information about the image files. According thereto, a user can collectively grasp an executable function with respect to all the image files stored in the USB memory.

In addition, in the list printing of S108, a thumbnail image of an image file (for example, "file01.tif" in FIG. 11), in which a direct printing function is not authorized, is not printed, and an alternative image indicating that printing of the image is not authorized is printed. That is, the image itself of the image file, in which the printing function is not authorized, is not printed. According thereto, security of the image can be kept.

If the execution of the printing is disabled due to a limit for the number of sheets of printing, the number of short pages in addition to disablement of printing may be displayed together. Further, an image file, in which execution of any functions is disabled, may be set not to be included in the image files whose list is printed.

If the list printing is not instructed (S107: NO) or after execution of the list printing by S108, the processing returns to S105, and the processing of S105 or later is repeated until the cancel key is pressed. In contrast, if the cancel key is pressed (S105: YES), the display unit 41 is returned to an initial state and the present processing is ended.

As described above in detail, the MFP 100 decides whether or not execution of each of the functions of direct printing function, FAX transmitting function and electronic mail sending function is authorized for each image file (image data). Then, after the decision of authorization of execution, notification of its result is provided by display on the display unit 41 or printing on the sheet 81. Consequently, a user can easily grasp which function is authorized for each image file.

In addition, the exemplary embodiment is only illustrative and does not limit the invention. Therefore, the invention can naturally make various improvements and modifications without departing from the gist of the invention. For example, the invention is not limited to the multi-function peripheral (MFP) and can be applied to a copy machine, a printer, a scanner, a FAX device, etc. as long as they include plural functions with respect to image data.

Figure 12:
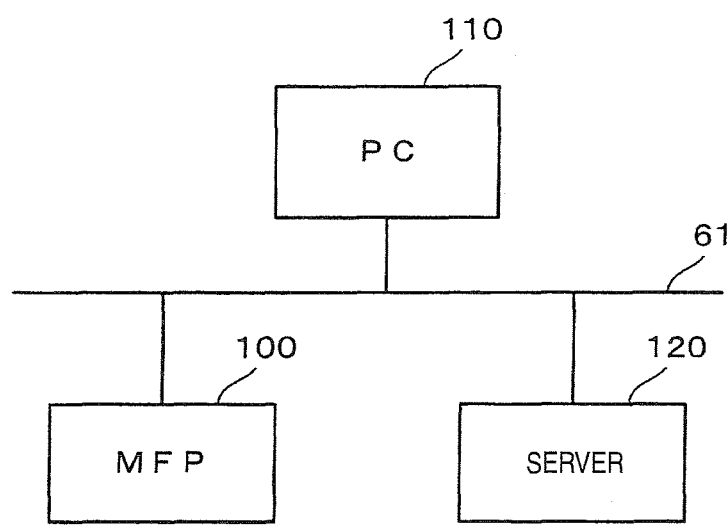
FIG. 12 is a diagram showing one example of a network configuration including the MFP.

In the above-described exemplary embodiments, a function of an image file stored in the USB memory is displayed, but the invention is not limited to this. For example, when the MFP 100 is connected to a PC 110 or a server 120 through a network 61 as shown in FIG. 12, an image file stored in the PC 110 or the server 120 may be targeted for notification.

In the above-described exemplary embodiments, a function list of an image file is displayed on the display unit 41 of the MFP 100. However, the invention is not limited thereto. For example, in a network configuration shown in FIG. 12, a function list per image files executable by the MFP 100 may be displayed on a display of the PC 110. Also, an authorization condition and a function supported by the MFP 100 may be stored by the server 120 to configure the image processing system by the image file stored in the PC 110 and a display of the server 120.

In the above-described exemplary embodiments, the authorization table 341 for storing a function of authorizing execution is prepared. Alternatively, a limit table for storing a function of limiting execution may be prepared. That is, the invention could decide whether or not each function in which the image data is targeted for processing can respectively be executed for each image data.

In the above-described exemplary embodiments, a function of authorizing execution is determined by a user or an attribute of an image file of the number of pages, an extension of a file, etc., but the determining condition is not limited to this. For example, possibility or impossibility of execution may be determined in consideration of a limit originally had by an apparatus, the degree of secrecy of a file or a time zone used.

In the above-described exemplary embodiments, as a form of providing notification that execution of any functions is disabled in the image file, the image file is not displayed. Further, as a form of providing notification that execution of the function is disabled, a postscript of a character string "disabled", which indicates that execution of the function is disabled, is also displayed. However, the invention is not limited. For example, sorting of display order, addition of a cancel line, reverse display or grayout display of the image file etc. can be applied. That is, the image file, in which execution of any functions is disabled (i.e., in which all functions are not authorized to be executed) is notified in a different style from another image data. Incidentally, when notification of disablement of execution is provided by changing a form of display insistently rather than non-display, notification of presence of a function of impossibility of execution can be provided. On the other hand, if the file, in which any functions are disabled, or the disabled function is set to be not displayed, a number of functions or image files to be notified decreases, and it becomes easier to grasp an image file whose function is enabled or an executable function.

The image processing system according to the invention can execute plural functions with respect to image data and further has a function of limiting use of each of the functions. The "functions" performed with respect to image data include printing, scanning, copying, FAX transmitting and electronic mail sending. The image processing system of the invention decides whether or not execution of each function is authorized with respect to image data. The decision of authorization is made according to, for example, an attribute (an extension, a flag of secret information, the amount of data, etc.) of image data. After the decision of authorization of execution, notification of the result is provided so that an authorized function and an unauthorized function can be identified. As a form of "notification", for example, the notification may be displayed on a screen or may be printed on a sheet.

That is, in the image processing system of the invention, notification of a result of decision as to whether or not to authorize execution of a function with respect to image data is provided. For example, an authorized function is distinguished from an unauthorized function and notification is provided for each image data. Or, image data, in which execution of a function is authorized, is distinguished from image data in which execution of its function is unauthorized and notification is provided for each function. Since notification of the result of decision as to whether or not to authorize execution of the function is provided so that the authorized function and the unauthorized function can be identified thus, a user can grasp which function is authorized.

According to another aspect of the invention, in the image processing system, wherein the decision unit decides whether or not a function among the plural functions is authorized to be executed with respect to each of a plurality of image data, wherein the notification unit identifiably notifies the authorized function and the unauthorized function with respect to each of the plurality of image data, and wherein the notification unit collectively notifies the authorized functions and the unauthorized functions of the plurality of image data.

As a form of providing notification collectively, for example, there are list display on a screen and index printing for printing an image by a list. Consequently, authorization states of plural image data can be grasped collectively.

According to still another aspect of the invention, in the image processing system, wherein the notification unit collectively notifies a plurality of authorized functions with respect to the image data.

According thereto, an authorization state of each function can be grasped collectively for each image data.

According to still another aspect of the invention, in the image processing system, wherein the notification unit notifies one of the plurality of image data, in which all functions are not authorized to be executed, in a different style from another one of the plurality of image data, in which at least one function among the plural functions is authorized to be executed.

As a form of notification in a state of assigning priorities, for example, there are non-notification, grayout and sorting of notification order. That is, by providing notification of image data having possibility of execution and image data having impossibility of execution in a state of respectively assigning priorities to the image data, it becomes easy to grasp whether or not execution of the image data is authorized.

According to still another aspect of the invention, the image processing system further comprises: a function selection unit that selects a function to be executed among the plural functions, wherein the notification unit notifies one of the plurality of image data, in which the function selected by the function selection unit is not authorized to be executed in a different style from another one of the plurality of image data, in which the function selected by the function selection unit is authorized to be executed.

That is, by providing notification of authorized image data and unauthorized image data for each function in a state of respectively assigning priorities to the image data, it becomes easy to grasp whether or not execution of the image data is authorized.

According to still another aspect of the invention, the image processing system further comprises: an image selection unit that selects one of the plurality of image data whose function is to be executed, wherein the notification unit notifies one of the plural functions with respect to the image data selected by the image selection unit, which function is not authorized to be executed, in a different style from another one of plural functions with respect to the image data selected by the image selection unit, which function is authorized to be executed.

That is, by providing notification of an authorized function and an unauthorized function for each image data in a state of respectively assigning priorities to the functions, it becomes easy to grasp the authorized function.

According to still another aspect of the invention, in the image processing system, wherein the plural functions comprise a printing function of printing the image data, wherein, in each of the plurality of image data, the notification unit associates the image data with the authorized function and the unauthorized function with respect to the image data, and wherein the notification unit prints the image data while the notification unit does not print the image data, in which the printing function is not authorized to be executed.

That is, by printing a result of decision as to whether or not execution of each function is authorized with respect to image data, the result of decision can easily be grasped through a sheet. Further, the image itself of image data, in which a printing function is unauthorized, is not printed. Therefore, notification of an authorization state can be provided properly with keeping the contents of the image data secret.

According to still another aspect of the invention, the image processing system further comprises: a setting unit that sets authorization of each function according to an attribute of the image data, wherein the decision unit makes the decision according to the authorization set by the setting unit.

According thereto, image data can be associated with information as to whether or not execution of a function is authorized and be set according to free setting by a user. As a result of that, higher flexibility can be given to a limit of the function.

According to still another aspect of the invention, in the image processing system, wherein the plural functions comprise a printing function of printing the image data, and wherein the decision unit decides whether or not the printing function is authorized to be executed according to a number of sheets of printing of the image data by the printing function.

According thereto, the number of sheets of printing can be managed.

According to still another aspect of the invention, in the image processing system, wherein the image data whose function is to be executed is stored in an external storage medium, and wherein the notification unit executes notification upon connection of the external storage medium.

That is, by executing notification at timing at which an external storage medium (i.e., USB memory) is connected, a user can grasp whether or not a function is authorized before execution of each function is instructed. Hence, reduction in confusion of the user can be expected.

What is claimed is:

1. An image processing apparatus comprising:
a first memory storing a table, the table including information indicating relationships between a plurality of functions, a plurality of file formats and a plurality of users so as to determine that a particular function is executable with respect to a particular file format but not executable with respect to another file format, the plurality of functions including at least two or more of printing, email and facsimile, and the plurality of file formats includes at least two or more of pdf, tiff and doc;
a second memory storing a plurality of files comprising a first file described in a first file format and a second file described in a second file format;
a display unit; and
a controller configured to:
identify a user;
retrieve the first file and the second file from the second memory;
determine whether each of the plurality of functions is executable with the first file by reference to the information in the table in accordance with the first file format of the first file and the identified user;
determine whether each of the plurality of functions is executable with the second file by reference to the information in the table in accordance with the second file format of the second file and the identified user;
display a list of file names of the first file and the second file in a first style on the display unit, the first file name being displayed on the list when a first executable function is determined to be executable with the first file, the first executable function being at least one of the plurality of functions,
the second file name being displayed on the list when a second executable function is determined to be executable with the second file, the second executable function being at least one of the plurality of functions;
receive a first input of the identified user indicating a particular function, the particular function being one of the plurality of functions;

in response to receiving the first input, display, on the display unit, the first file name and the second file name and the executable function when the particular function is identical to the first executable function and the second executable function;

receive a second input of the identified user designating the first file to be executed under the particular function;

in response to receiving the second input, execute the particular function with the first file;

receive a third input of the identified user indicating the first file on the list;

in response to receiving the third input, display on the display unit the first file name and the functions executable with the first file;

receive a fourth input of the identified user indicating to execute one of the functions executable with the first file;

in response to receiving the fourth input, execute the executable function with the first file.

2. The image processing apparatus according to claim 1, further comprising:

an image forming unit configured to print image on a paper, wherein the plurality of functions includes a printing function;

wherein the controller is further configured to:
receive a fifth input of the identified user indicating an index printing;
in response to receiving the fourth input indicating the index printing,
generate print data that includes a file name of each of the plurality of files, an executable function for each of the plurality of files and a thumbnail image for each of the plurality of files,
wherein, when it is determined that the printing function is not executable with at least one of the plurality of files, the generated print data does not include the thumbnail image for the at least one of the plurality of files.

3. The image processing apparatus according to claim 2, wherein the controller is further configured to:
determine a number of pages of each of the plurality of files;
determine a current number of printed pages;
determine whether a sum of the current number of printed pages and the number of pages of the plurality of files is greater than a predetermined threshold value, determine that the printing function is not executable with the plurality of files when the sum of the current number of printed pages and the number of pages of the plurality of files is greater than the predetermined threshold value.

4. The image processing apparatus according to claim 1, further comprising:
an interface configured to receive an external storage device storing the first file and the second file;
wherein the second memory is the external storage device connected to the interface,
wherein the controller is further configured to:
determine whether the external storage device is connected to the interface;
when it is determined that the external storage device is connected to the interface,
identify a user;
retrieve the first file and the second file from the second memory;
determine whether each of the plurality of functions is executable with the first file by reference to the information in the table in accordance with the first file format of the first file and the identified user;
determine whether each of the plurality of functions is executable with the second file by reference to the information in the table in accordance with the second file format of the second file and the identified user;
display a list of file names of the first file and the second file in a first style on the display unit, the first file name being displayed on the list when a first executable function is determined to be executable with the first file, the first executable function being at least one of the plurality of functions,
the second file name being displayed on the list when a second executable function is determined to be executable with the second file, the second executable function being at least one of the plurality of functions;
receive a first input of the identified user indicating a particular function, the particular function being one of the plurality of functions;
in response to receiving the first input, display, on the display unit, the first file name and the second file name and the executable function when the particular function is identical to the first executable function and the second executable function;
receive a second input of the identified user designating the first file to be executed under the particular function;
in response to receiving the second input, execute the particular function with the first file;
receive a third input of the identified user indicating the first file on the list;
in response to receiving the third input, display on the display unit the first file name and the functions executable with the first file;
receive a fourth input of the identified user indicating to execute one of the functions executable with the first file;
in response to receiving the fourth input, execute the executable function with the first file.

5. The image processing apparatus according to claim 1, wherein the controller is further configured to:
display, on the display unit, the first file and a first non-executable function in a second style different from the first style when the first non-executable function is determined not to be executable with the first file, the first non-executable function being at least one of the plurality of functions.

6. The image processing apparatus according to claim 5, wherein the controller is further configured to:
when it is determined that none of the plurality of functions is executable with the at least one of the plurality of files, display, on the display unit, the at least one of the plurality of files in a third style different from the first style and the second style.

7. The image processing apparatus according to claim 6, wherein the controller is further configured to:
when it is determined that none of the plurality of functions is executable with the at least one of the plurality of files, display, on the display unit, the at least one of the plurality of files in grayed-out style as the third style.

8. A non-transitory computer-readable storage medium storing a computer program readable by a computer in an image processing apparatus, the image processing apparatus comprising a first memory storing a table, the table including information indicating relationships between a plurality of functions and a plurality of file formats so as to determine that a particular function is executable with respect to a particular file format but not executable with respect to another file format; a second memory storing a plurality of files comprising a first file described in a first file format and a second file described in a second file format; and a display unit,
  wherein the computer program, when executed by the computer, causes the image processing apparatus to perform operations comprising:
    identify a user;
    retrieve the first file and the second file from the second memory;
    determine whether each of the plurality of functions is executable with the first file by reference to the information in the table in accordance with the first file format of the first file and the identified user;
    determine whether each of the plurality of functions is executable with the second file by reference to the information in the table in accordance with the second file format of the second file and the identified user;
    display a list of file names of the first file and the second file in a first style on the display unit, the first file name being displayed on the list when a first executable function is determined to be executable with the first file, the first executable function being at least one of the plurality of functions,
    the second file name being displayed on the list when a second executable function is determined to be executable with the second file, the second executable function being at least one of the plurality of functions;
    receive a first input of the identified user indicating a particular function, the particular function being one of the plurality of functions;
    in response to receiving the first input, display, on the display unit, the first file name and the second file name and the executable function when the particular function is identical to the first executable function and the second executable function;
    receive a second input of the identified user designating the first file to be executed under the particular function;
    in response to receiving the second input, execute the particular function with the first file;
    receive a third input of the identified user indicating the first file on the list;
    in response to receiving the third input, display on the display unit the first file name and the functions executable with the first file;
    receive a fourth input of the identified user indicating to execute one of the functions executable with the first file;
    in response to receiving the fourth input, execute the executable function with the first file.

* * * * *